United States Patent

Ach et al.

[11] 3,887,097
[45] June 3, 1975

[54] APPARATUS FOR AUTOMATIC LOADING AND UNLOADING OF AN ELEVATOR CABIN

[75] Inventors: Ernst Ach, Ebikon, Switzerland; Walter Herding, Amberg, Germany

[73] Assignee: Inventio Aktiengesellschaft, Hergiswil NW, Switzerland

[22] Filed: Mar. 29, 1974

[21] Appl. No.: 456,061

[30] Foreign Application Priority Data
Apr. 2, 1973 Switzerland.................. 4714/73

[52] U.S. Cl. .............................. 214/730; 214/750
[51] Int. Cl. ........................................ B65g 47/00
[58] Field of Search ....... 214/750, 730, 731, 16.4 A, 214/95 R

[56] References Cited
UNITED STATES PATENTS
| | | | |
|---|---|---|---|
| 3,239,088 | 3/1966 | Sano | 214/730 |
| 3,447,704 | 6/1969 | Guilbert, Jr. | 214/730 |
| 3,565,270 | 2/1971 | Guilbert, Jr. et al. | 214/730 |

Primary Examiner—Robert J. Spar
Assistant Examiner—Lawrence J. Oresky
Attorney, Agent, or Firm—Werner W. Kleeman

[57] ABSTRACT

An apparatus for the automatic loading and unloading of an elevator cabin equipped with at least one transport carriage which travels along with the elevator cabin, the transport carriage being displaceable at a story of the building out of and into the elevator cabin respectively, by means of a buckling-resistant driven roller chain trained about guides below the floor of the elevator cabin and engaging with an entrainment member of the transport carriage. With the transport carriage located at a starting position in the elevator cabin both confronting terminal or end elements of the buckling-resistant roller chain engage with the entrainment member secured to the transport carriage and confronting the elevator cabin floor. The buckling-resistant roller chain is driven through the agency of two synchronously rotating sprocket wheels rotatably mounted behind one another in the direction of movement of the transport carriage to both sides of the entrainment member of the transport carriage which is located in the starting position. During the outward movement of the transport carriage in the one or other direction of travel the forwardly located terminal element is disengaged from the entrainment member upon passing the corresponding sprocket wheel and during the return travel is again re-engaged and the other terminal element in the engaged position transmits the drive force to the transport carriage.

8 Claims, 6 Drawing Figures

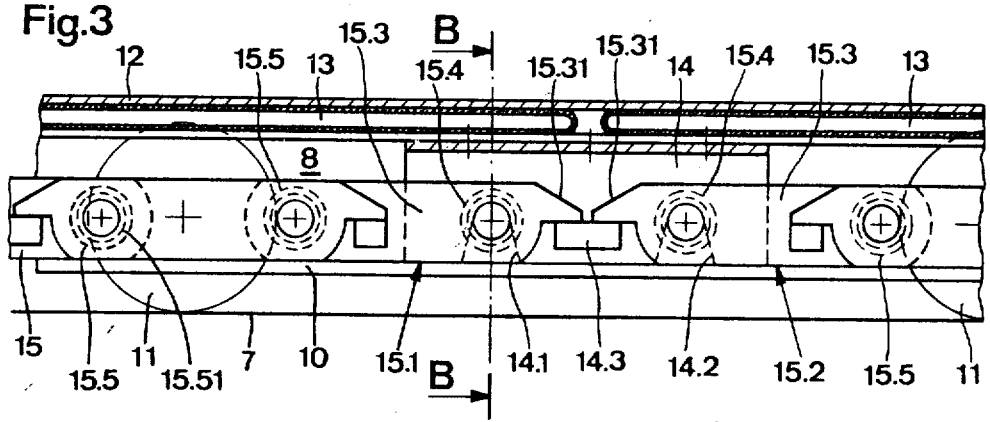
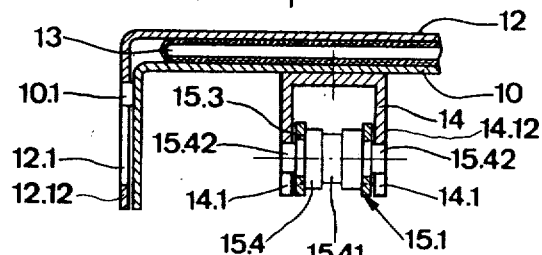
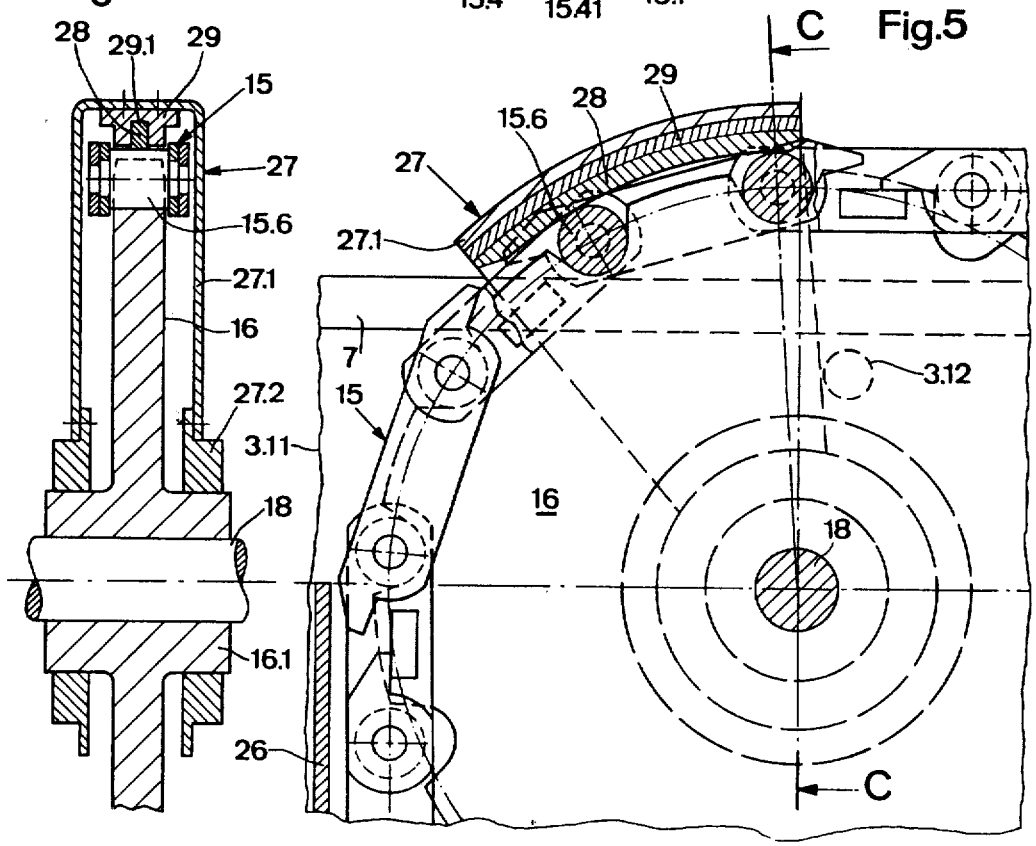

APPARATUS FOR AUTOMATIC LOADING AND UNLOADING OF AN ELEVATOR CABIN

BACKGROUND OF THE INVENTION

The present invention relates to a new and improved construction of apparatus for the automatic loading and unloading of an elevator cabin which is of the type equipped with at least one transport carriage which moves together with the elevator cabin, the transport carriage can be moved out or into the elevator cabin at a story of the building through the action of a driven buckling- or kink-resistant roller chain which is deflected about guides at the floor of the elevator cabin and engaging with an entrainment member of the transport carriage.

In different structures or buildings, such as department stores, hospitals or warehouses there are utilized elevators or lifts for conveying pallets, containers, beds and the like, and these elevators are equipped with devices for the automatic loading and unloading of the elevator cabin. With such type material handling systems there is thus not required an operator and there can be realized shorter transport times of the relevant goods or materials.

Furthermore, in this particular field of technology there has become known to the art an automatic loading and unloading apparatus wherein an entrainment carriage is moved by a buckling- or kink-resistant roller chain. The drive and wind-up mechanism for the roller chain are arranged beneath the floor of the elevator cabin. The entrainment carriage is equipped at its upper region with a gripper mechanism in order to engage, for instance, transport carriages or mobile beds. This loading and unloading apparatus possesses the advantage that owing to the provision of the buckling-resistant roller chain it can be designed to handle entrainment carriages which theoretically can be moved a random distance out of the elevator cabin. On the other hand, drawbacks of such apparatus particularly reside in the fact that the entrainment carriage can only depart from the elevator cabin in one direction and it is not suitable for the handling of pallets. It can only convey automatic traveling objects for which there are provided special means for the lateral guiding thereof.

Another state-of-the-art apparatus for the automatic loading and unloading of an elevator possesses two mechanically separated transport carriages which travel along with the elevator cabin, each transport carriage can be driven by a respective hydraulic motor installed thereat. The hydraulic motors are connected via flexible pressure medium lines with a pump assembly arranged beneath the cabin floor. In order to lift pallets the transport carriages are additionally equipped with a respective hydraulic lift mechanism which likewise are operatively connected via the flexible pressure medium lines with the pump assembly. In order to guide the transport carriages there are provided grooves at both the floor of the cabin and the floor of the story of the building. Such loading and unloading mechanism possesses that the transport carriages equipped with lift mechanisms can be moved out of the elevator cabin in two directions which are diametrically opposite one another. Drawbacks of this system are seen in terms of the complicated drive of the transport carriages, and the synchronous running of both carriages can lead to particular difficulties.

SUMMARY OF THE INVENTION

Hence, it will be recognized that this particular field of technology is still in need of an improved apparatus for the automatic loading and unloading of an elevator cabin. Therefore, it is a primary object of the present invention to provide such type apparatus which effectively and reliably fulfills the need still existing in the art.

Another and more specific object of the present invention aims at the provision of a new and improved construction of apparatus for the automatic loading and unloading of an elevator cabin equipped with one or a number of transport carriages or cars, wherein the transport carriages do not possess the aforementioned drawbacks of the prior art proposals and can be moved out of the elevator cabin in two oppositely situated directions by means of buckling-resistant roller chains.

Still a further significant object of the present invention relates to an improved apparatus for loading and unloading an elevator cabin incorporating at least one transport carriage and drive mechanism of relatively simple construction and design for loading and unloading the transport carriage into and out of the elevator cabin in two diametrically opposite directions, thus improving upon the versatility of the elevator and its material handling use, and furthermore, wherein such apparatus is extremely reliable in operation and requires a minimum of servicing and maintenance.

Now in order to implement these and still further objects of the invention, which will become more readily apparent as the description proceeds, the apparatus for the automatic loading and unloading of an elevator cabin of the previously mentioned type is manifested by the features that with the transport carriage located in the starting position in the elevator cabin both confronting terminal elements of the kink-resistant or buckling- resistant roller chain are engaged with the entrainment member attached with the transport carriage and confronting the cabin floor. The buckling-resistant roller chain is driven through the agency of two synchronously rotating sprocket wheels which are rotatably mounted at the cabin floor behind one another in the direction of movement of the transport carriage to both sides of the entrainment member of the transport carriage which is located in the starting position. During movement of the transport carriage in the one or the other direction of travel out of the elevator cabin the corresponding forwardly located terminal element is disengaged from the entrainment member upon passing the corresponding sprocket wheel and is re-engaged when the transport carriage moves back into the elevator cabin and the corresponding other terminal element in the engaged position transmits the drive force to the transport carriage.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3 is an enlarged detail view of a transport carriage or car used with the apparatus of FIG. 1;

FIG. 4 is a partial cross-sectional view of the transport carriage shown in FIG. 3, taken substantially along the line B—B thereof;

FIG. 5 is a detail showing of a chain or sprocket wheel of the apparatus depicted in FIG. 1 portrayed on an enlarged scale; and FIG. 6 is a partial cross-sectional view of the sprocket wheel shown in FIG. 5, taken substantially along the line C—C thereof.

DETAILED DESCRIPTION OF THE PREFERRED EMBODIMENTS

Figure 1:
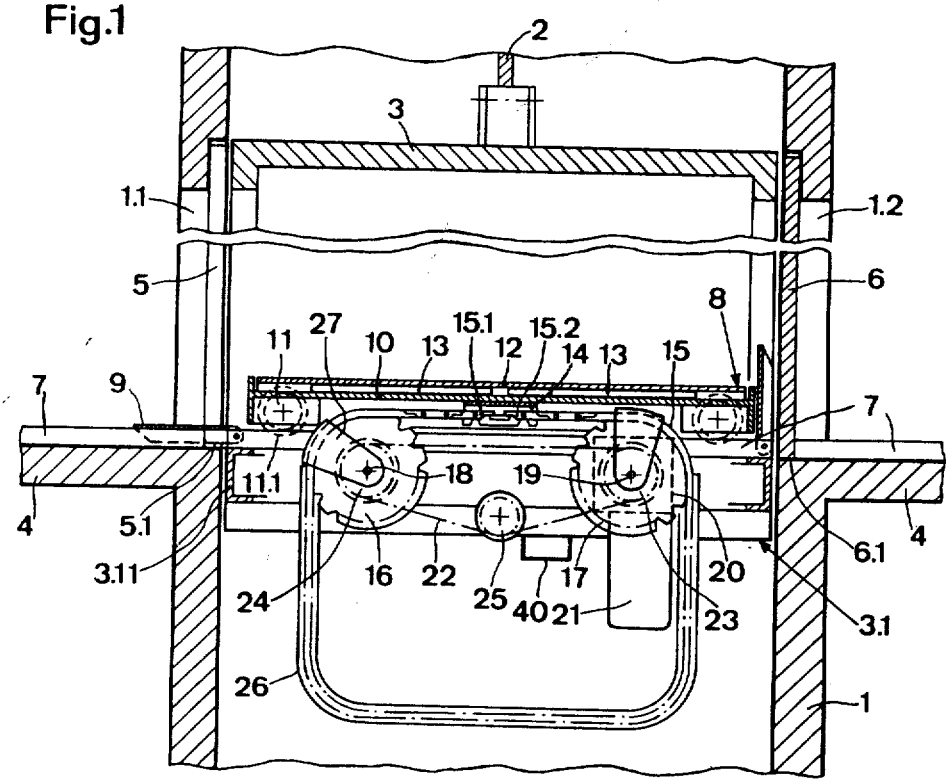
FIG. 1 is a vertical sectional view, taken substantailly along the line A—A of FIG. 2, of an apparatus designed according to the invention for the automatic loading and unloading of an elevator cabin at a transit location.
Figure 2:
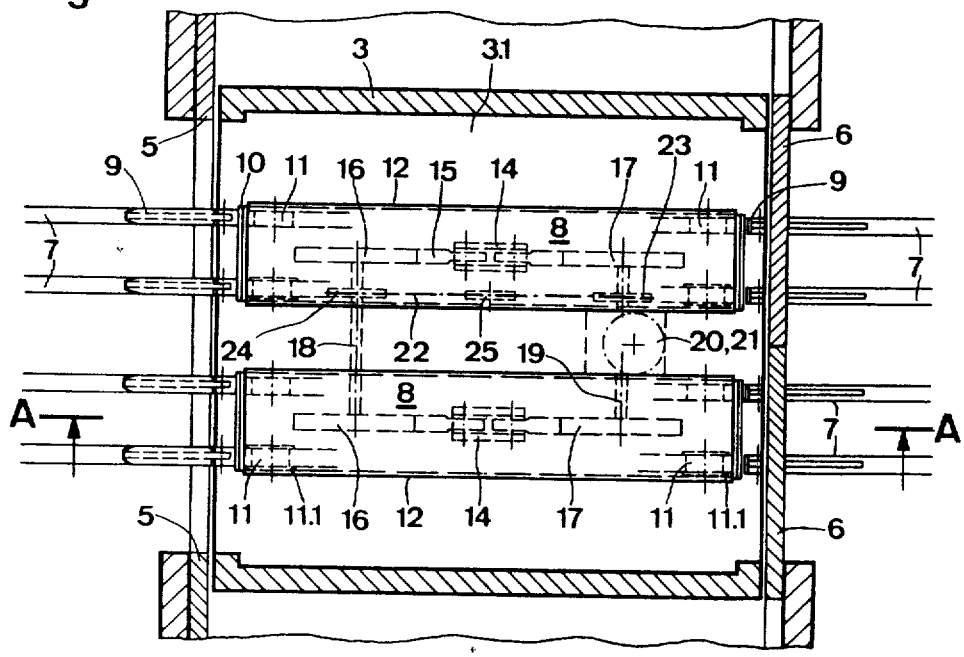
FIG. 2 is a plan view of the apparatus depicted in FIG. 1 for the automatic loading and unloading of the elevator cabin at a transit location or station.

Describing now the drawings, it is to be understood that details of the invention as concerns the loading and unloading apparatus of this development have been shown in the drawings, whereas certain features of the construction of the elevator cabin which are not particularly important for a complete understanding of the underlying concept have either only been generally referred to or shematically shown as a matter convenience. Now in FIGS. 1 and 2 reference numeral 1 designates an elevator or lift shaft in which there is suspended at a conveying cable 2 or the like an elevator cabin 3. Shaft openings 1.1 and 1.2 are provided at two diametrically opposite sides of the elevator shaft 1 at each floor or story 4 of the building. These shaft openings 1.1 and 1.2 can be conveniently closed by means of suitable and conventionally constructed automatic sliding doors 5 and 6 respectively. In FIGS. 1 and 2 there is shown, for instance, the sliding doors 5 open and the other sliding doors 6 closed. At the story or floor 4 and at the cabin floor 3.1 there are embedded, for instance, four guide or travel rails 7 which are essentially in parallelism In the showing of FIGS. 3 and 4 the components 7, 8, 10 to 15 and 15.1, 15.2 constitute the same components considered above with regard to the description of FIGS. 1 and 2. The entrainment member 14, which in cross-section possesses a substantially U-shaped configuration, is for instance threadably fixedly connected with the cassis or frame 10 of the transport carriage 8. In both of the U-legs 14.12 of the entrainment member 14 there are located two respective open slots 14.1 and 14.2 which widen conically downwardly, as best seen by referring to FIG. 3. At the inside of the U-legs 14.12 there are mounted rectangular stops 14.3 between both of the slots 14.1 and 14.2. The respective terminal or end elements 15.1 and 15.2 of the open buckling-resistant roller chain 15 which can be engaged by the associated entrainment member 14 consists of two brackets 15.3 connected with one another by a roller bolt 15.4 The terminal elements 15.1 and 15.2 are members 9 are rocked down into an essentially horizontal position, by means of a conventional and therefore not particularly illustrated mechanism, during such time as each transport carriage 8 moves out of the elevator cabin, so that there can be bridged the door guide 5.1 and 6.1 respectively, the gap between the elevator cabin 3 and the elevator shaft 1 as well as any possible elevational difference which prevails due to inaccurate stopping of the elevator cabin 3 at the story of the building, and there is ensured for a safe and positive transfer of each transport carriage or car 8 out of the elevator cabin 3.

Each of the transport carriages or cars 8 possesses a frame of chassis 10 in or at which there are rotatably mounted four traveling wheels or rollers 11. The traveling wheels 11 which are located at one longitudinal side of the transport carriage 8 are equipped with wheel rims or flanges 11.1 which engage with suitable recesses extending to both sides of and along the associated traveling rail 7 and which ensure for the proper lateral guiding of the associated transport carriage 8. Since the transport carriages 8 are of identical construction it will be sufficient to merely describe one such transport carriage. Thus, for taking-up loads there is provided a substantially U-shaped carrier or support 12 which rests upon two lifting pillows or cushions 13 which in turn are supported at the carriage frame or chassis 10. The carrier or support 12 is guided by means of slots 12.1 which are located in its U-legs 12.12 and in which engage bolts 10.1 mounted at the lengthwise extending sides of the chassis 10, as best seen by referring to FIG. 4. The two lifting cushions 13 are connected through the agency of a common flexible pressure medium line with a fluid operated e.g. pneumatic displacement device arranged beneath the cabin floor 3.1, as generally indicated by reference character 40 and not further shown in the drawings in order to preserve clarity in illustration. The flexible pressure medium line, during movement of a transport carriage 8, is respectively rolled-on and rolled-off of a hose drum arranged beneath the cabin floor 3.1. At the center of the transport carriage 8 there is secured an entrainment member 14 at which engage both of the terminal or end elements 15.1 and 15.2 of a conventional kink- or buckling-resistant roller chain 15 which serves for the displacement of the transport carriage 8. Such buckling-resistant roller chains are only deflectable in one direction.

As concerns the exemplary embodiment under discussion where there are provided, by way of example, two transport carriages or cars 8, two kink- or buckling-resistant roller chains 15 are provided for the displacement of such two transport carriages 8, these roller chains 15 being driven by two respective equal size chain or sprocket wheels 16, 17. Both of the the sprocket wheels 16 are secured to a shaft 18 which is rotatably mounted at the support or carrier construction 3.11 of the cabin floor 3.1. Both of the sprocket wheels 17 are secured to a drive shaft 19 which likewise is rotatably mounted at the carrier or support construction 3.11 and driven through the agency of a transmission or gearing 20 from a suitable prime mover or drive motor 21. Transmission of the rotational moment from the drive shaft 19 to the shaft 18 occurs through the intermediary of a chain 22 which is driven by a sprocket wheel 23 secured to the drive shaft 19, sprocket wheel 23 driving an equal size sprocket wheel 24 seated upon the other shaft 18. The chain 22 is additionally guided via a chain tensioning wheel 25 which is conveniently displaceably mounted at the support construction 3.11.

The buckling-resistant roller chain 15 slides, in a chain guide 26 fixedly connected with the carrier or support construction 3.11, from the sprocket wheel 16 to the sprocket wheel 17 and vice versa and thus is deflected twice. There are also provided rotatably mounted guides 27 at the sprocket wheels 16 and 17, these guides 27 are concentrically arranged with respect to the center of rotation of the sprocket wheels. The rotatably mounted guides 27 will be considered in greater detail hereinafter in conjunction with the descriptionn of FIGS. 5 and 6.

In the showing of FIGS. 3 and 4 the components 7, 8, 10 to 15 aand 15.1, 15.2 constitute the same components considered above with regard to the description of FIGS. 1 and 2. The entrainment member 14, which in cross-section possesses a substantially U-shaped configurationk is for instance threadably fixedly connected with the chassis or frame 10 of the transport carriage 8. In both of the U-legs 14.12 there are mounted rectangular stops 14.3 between both of the slots 14.1 and 14.2. The respective terminal or end elements 15.1 and 15.2 of the open buckling-resistant roller chain 15 which can be engaged by the associated entrainment member 14 consists of two brackets 15.3 connected with one another by a roller bolt 15.4 The terminal elements 15.1 and 15.2 are hingedly connected by means of a roller bolt 15.5 with the corresponding next neighboring chain element which, in turn, likewise is hingedly connected through the agency of a roller bolt 15.5 with the next chain element. The further connection with the remaining chain elements or links of the chain as well as the connection of the remaining chain elements with one another occurs through the agency of roller bolts 15.6, as best seen by referring to FIGS. 5 and 6. The roller bolts 15.4 and 15.5 are equipped with grooved or recessed portions 15.41 and 15.51 respectively, the purpose of which will be discussed more fully with regard to the description of FIG. 6. The roller bolts 15.4 of the terminal chain elements 15.1 and 15.2 additionally possess cylindrical projections 15.42 at their ends which can be engaged with the slots 14.1 and 14.2 respectively of the entrainment member 14. In order that the terminal elements 15.1 and 15.2, during horizontal position, do not disengage from the slots 14.1 and 14.2, they bear by means of projections 15.31 upon the stops 14.3.

Now in FIGS. 5 and 6 the components 3.11, 7, 15, 16, 18, 26 and 27 designate the same components as discussed above and shown in FIGS. 1 to 4. Each guide 27 consists of a substantially U-shaped bracket 27.1 which covers a certain sector or region of the associated sprocket wheel, such as sprocket wheel or gear 16 shown in FIGS. 5 and 6. This U-shaped covering bracket 27.1 is threadably connected with two bearing flanges 27.2 rotatably mounted at the hub 16.1 of the sprocket wheel 16 and concentrically arranged with respect to the shaft 18. At the inside or inner wall portion of the bracket 27.1 which extends parallel to the roller bolt 15.6 there is secured a segment 29 equipped with a groove 29.1 into which there is inserted a friction or frictional insert 28 formed of elastic material. The dimensions of the friction insert 28 are chosen such that it exerts a pressure upon the roller bolts 15.6 of the buckling-resistant roller chain 15. During rotation of the sprocket wheel 16 in the clockwise direction the guide 27 is entrained, owing to the friction which prevails between the roller bolts 15.6 and the friction insert 28, until it has reached the predetermined position depicted in FIG. 5 which is fixed by a stop 13.12 which is mounted at the carrier or support construction 3.11. During further rotation of the sprocket wheel 16 and the displacement of the roller chain 15 the guide 27 prevents the reaction force which opposes the thrust force of the roller chain 15 from lifting the roller chain 15 off the sprocket wheel 16. During rotation of the sprocket wheel 16 in the counterclockwise direction the guide 27 is entrained by the roller chain 15 until it impacts against the chain guide 26.

The recesses or grooved portions 15.41 and 15.51 (FIGS. 3 and 4) provided at the roller bolts 15.4 and 15.5 respectively, are designed and dimensioned such that the friction insert 28 does not contact the roller bolts 15.4 and 15.5. Consequently, there is rendered possible the introduction of the roller chain 15 between the sprocket wheel 16, rotating in the clockwise direction, and the guide 27, without the guide 27 being entrained. Entrainment only then occurs due to the action of the first roller bolt 15.6 of the roller chain 15, wherein at the same time the entrainment member 14 of the transport carriage 8 which has been moved into the elevator cabin 3 has reached a position which is located between the sprocket wheels 16 and 17.

Having now had the benefit of the foregoing discussion of the construction of a preferred exemplary embodiment of apparatus as contemplated by the invention the mode of operation thereof will now be considered and is as follows: If a transportable article or object, such as for instance a pallet, container, bed and so forth, located at the story or floor 4 of the building in front of the sliding door 5 is to be transported to another story of the building in which there is located the elevator cabin, then by means of a relevant push button or the like there is introduced the designation of the target story into the elevator control (not shown) which can be of conventional design. As soon as the elevator cabin 3 has arrived at the story or floor 4, the automatic sliding doors 5 open and the drive motor 21 drives, through the agency of the transmission 20, the drive shaft 19 and both of the sprocket wheels 17. By means of the chain 22 the rotational moment is transmitted through the intermediary of the sprocket wheel 23, the sprocket tensioning wheel 25 and the sprocket wheel 24, to the shaft 18. Since the sprocket wheels 23 and 24 are of identical size the sprocket wheels 16 seated upon the shaft 18 possess the same rotational speed and the same rotational sense as the sprocket wheels 17. The buckling-resistant roller chains 15 which travel over the sprocket wheels 16, 17, and which roller chains are engaged with the entrainment members 14 of the transport carriages 8, thus displace both transport carriages 8 which travel along the traveling rails 7 in synchronism out of the elevator cabin 3. To ensure for the faultless movement of the transport carriages or cars 8 out of the elevator cabin 3, and as already explained previously with regard to the description of FIGS. 1 and 2, the bridge members 9 are tilted into a horizontal position. Upon travel over the sprocket wheels 16 the terminal elements 15.1 of the roller chains 15 are disengaged from the entrainment members 14 in that the cylindrical projections 15.42 of the roller bolts 15.4 slide out of the conically downwardly widening open slots 14.1 of the entrainment member 14.

A suitable control device arranged beneath the cabin floor 3.1 conveniently determines the length of the path of travel through which the transport carriages should move, controls the braking operation and brings the transport carriages 8 to standstill at the terminal position. The roller chains 15 are only still in engagement with the sprocket wheels 17. It is now assumed that the terminal position of the transport carriages 8 is identical with the position of the transportable article or object which has been placed at the story or floor 4. After stopping the transport carriages 8 the displacement device 40 which is arranged beneath the cabin floor begins to operate, so that by means of the pressure fluid medium lines wound-off of the hose drum and carried by the transport carriages 8 the pneumatic pressurized fluid medium flows into the lifting cushions 13, with the result that the carrier or support 12 and thus the transportable article is raised. After the object, for instance a pallet, has reached a predtermined position limited by the stop 10.1, then the transport carriages 8 are retracted together with the transportable articles raised from the floor back into the elevator cabin 3. During travel over the sprocket wheels 16 the terminal elements 15.1 of the roller chain 15 are again engaged with the entrainment member 14. If the transport carriages 8 have reached their starting position within the elevator cabin 3, then they are stopped by contacts arranged at the control device in standard manner. After the bridge members 9 have again been brought into vertical position by the transport carriages 8, the sliding doors 5 close and the elevator cabin 3 moves in the direction of the target story.

The unloading operation occurs in the same manner as the loading operation with the exception that the pressure in the lifting cushions 13, and which pressure is maintained during travel to the target story, upon reaching the predetermined or desired position of the transportable article or object, is again reduce. After depositing the transportable article the transport carriages 8 with the lowered carriers or supports 12 move back into the elevator cabin 3, whereupon the sliding doors close and the elevator is ready for the next working operation.

The advantages which can be realized with the invention particularly reside in the fact that the transport carriages do not require their own drive, rather can be displaced out of the elevator cabin in two diametrically opposite directions by means of the associated buckling-resistant roller chain, and in the case of equipment which is provided with more than a single transport carriage the synchronized movement of the transport carriages is ensured since the sprocket wheels for the drive of the roller chains are fixedly seated upon common shafts.

It is possible to displaceably arrange, transverse to the direction of travel, the sprocket wheels 16, 17, the traveling rails 7 in the elevator cabin 3 and the chain guides 26. With this modification it is possible to realize an accommodation of the spacing of the transport carriage to conditions which prevail at the site and to variable transportable articles or the like.

As the medium for the pneumatic displacement device there can be used air or another suitable gas. Also instead of using a pneumatic displacement device there can be employed a hydraulic device.

While there is shown and described present preferred embodiments of the invention, it is to be distinctly understood that the invention is not limited thereto, but may be otherwise variously embodied and practiced within the scope of the following claims.

Accordingly, what is claimed is:

1. An apparatus for the automatic loading and unloading of an elevator cabin having an elevator cabin floor at a story of a building, comprising at least one transport carriage which can be moved along with the elevator cabin, a driven buckling-resistant roller chain, guide means for the roller chain beneath the floor of the elevator cabin, said transport carriage being provided with an entrainment member secured thereto and facing the cabin floor, the buckling-resistant roller chain engaging via the entrainment member with the transport carriage for selectively moving the transport carriage out of and into the elevator cabin at a story of the building, said transport carriage being capable of assuming a starting position in the elevator cabin, said buckling-resistant roller chain being provided with two confronting terminal elements, wherein in the starting position of the transport carriage in the elevator cabin both confronting terminal elements of the buckling- resistant roller chain engage with said entrainment member, said terminal elements confronting one another until one of said terminal elements disengages from said entrainment member, drive means incorportating two synchronously rotating sprocket wheels for driving the buckling-resistant roller chain, said sprocket wheels being rotatably mounted behind one another at the cabin floor one on each side of the entrainment member of the transport carriage when located in its starting position, each sprocket wheel having associated therewith one of said terminal elements, and wherein during travel of the transport carriage in the one or the other direction of travel one of said terminal elements defines a forwardly located terminal element, said forwardly located terminal element upon passing the associated sprocket wheel being disengaged from the entrainment member and upon return movement of the transport carriage being re-engaged with said entrainment element, and the other terminal element in the engaged position with the entrainment member transmitting a driving force to the transport carriage.

2. The apparatus as defined in claim 1, wherein the entrainment member possesses a substantially U-shaped cross-sectional configuration for receiving the terminal elements of the buckling-resistant roller chain, said terminal elements being provided with roller bolts equipped with cylindrical projections, said U-shaped entrainment member having U-legs equipped with conically extending open slots, said cylindrical projections being engageable with and disengageable from the conically extending open slots of the U-legs of the entrainment member.

3. The apparatus as defined in claim 1, further including a guide provided for each sprocket wheel for covering a predetermined sector of the associated sprocket wheel, each said guide comprising a substantially U-shaped bracket member secured to two bearing flanges, two stops provided for each guide, each sprocket wheel being provided with a hub and a shaft, each said guide being rotatably secured concentric to the shaft of the associated sprocket wheel at the hub of such associated sprocket wheel, said bracket member having an inner portion extending substantially parallel to roller bolts of the buckling-resistant roller chain, a segment attached to the inner portion of the bracket member, said segment being provided with a groove, a friction insert exerting a pressure upon the roller bolts inserted in said groove, so that during rotation of the associated sprocket wheel the associated guide is entrainable between said two stops.

4. The apparatus as defined in claim 3, wherein one of said stops is formed by said guide means.

5. The apparatus as defined in claim 1, wherein an additional transport carriage and an additional buckling-resistant roller chain is provided, said two transport carriages being driven by said two buckling-resistant roller chains, said drive means synchronously driving said two bucking-resistant roller chains, said drive means comprising two sprocket wheels for each roller chain, a respective common shaft upon which there is mounted a respective sprocket wheel of each roller chain.

6. The apparatus as defined in claim 1, further including a carrier, said transport carriage possessing a chassis, two lifting cushions which can be expanded by means of fluid operated displacement means secured beneath the floor of the cabin, said lifting cushions being located between the carrier and the chassis of the transport carriage for lifting material to be conveyed which has been deposited at a story of the building.

7. The apparatus as defined in claim 1, further including guide rails in the elevator cabin provided for the transport carriage, and wherein the sprocket wheels, the guide rails in the elevator cabin and the guide means are displaceably arranged transversely with respect to the direction of travel of the transport carriage.

8. An apparatus for the automatic loading and unloading of an elevator cabin at a story of a building, comprising at least one to-and-fro movable transport carriage which can be transported along with the elevator cabin, a driven buckling-resistant roller chain, guide means for the roller chain carried by the elevtor cabin, an entrainment member connected with said transport carriage, the buckling-resistant roller chain engaging via the entrainment member with the transport carriage for selectively moving the transport carriage out of and into the elevator cabin at a story of the building, said buckling-resistant roller chain being provided with two confronting spaced terminal elements engageable with said entrainment member, said terminal elements confronting one another until one of said terminal elements disengages from said entrainment member, drive means carried by said elevator cabin and incorporating two synchronously rotating sprocket wheels for driving the buckling-resistant roller chain, each sprocket cooperating operatively copperating with one of said terminal elements, and wherein during travel of the transport carriage in one or the other direction of travel a given one of said terminal elements defines a forwardly located terminal element, said forwardly located terminal element upon passing its cooperating sprocket wheel being disengaged from the entrainment member and upon return movement of the transport carriage being reengaged with said entrainment element, and the other terminal element in an engaged position with the entrainment member transmitting a driving force to the transport carriage.

* * * * *